(12) United States Patent
van Doorn et al.

(10) Patent No.: US 6,341,840 B1
(45) Date of Patent: Jan. 29, 2002

(54) METHOD OF PRINTING A SUBSTRATE AND A PRINTING SYSTEM CONTAINING A PRINTING DEVICE SUITABLE FOR USE OF THE METHOD

(75) Inventors: André van Doorn, Helmond; Eduard T. H. de Grijs, Venlo, both of (NL)

(73) Assignee: Oce-Technologies B.V., Venlo (NL)

( * ) Notice: Subject to any disclaimer, the term of this patent is extended or adjusted under 35 U.S.C. 154(b) by 0 days.

(21) Appl. No.: 09/635,801

(22) Filed: Aug. 11, 2000

(51) Int. Cl.[7] ................................................. B41J 2/145
(52) U.S. Cl. .............................. 347/41; 347/40; 347/12
(58) Field of Search .............................. 347/12, 40, 41, 347/43, 15

(56) References Cited

U.S. PATENT DOCUMENTS

| | | | | |
|---|---|---|---|---|
| 5,583,550 A | * | 12/1996 | Hickman et al. | 347/41 |
| 5,754,198 A | * | 5/1998 | Nishikawa | 347/43 |
| 5,777,638 A | * | 7/1998 | Salter et al. | 347/12 |
| 6,048,048 A | * | 4/2000 | Gregoire | 347/40 |
| 6,142,605 A | * | 11/2000 | Serra et al. | 347/43 |

\* cited by examiner

*Primary Examiner*—N. Le
*Assistant Examiner*—Lamson D. Nguyen

(57) ABSTRACT

A method and system for printing a substrate with an inkjet printing device provided with at least one printhead comprising at least one row of nozzles having a first end and a second end, such that an orientation of the row with respect to the substrate is defined by an imaginary line extending from the first end to the second end, wherein a strip of the substrate is provided with ink drops in a first printing stage and the strip is provided with supplementary ink drops in a second printing stage, whereby the orientation of the row used in the first printing stage is substantially the opposite to the orientation of the row used in the second printing stage.

7 Claims, 9 Drawing Sheets

METHOD OF PRINTING A SUBSTRATE AND A PRINTING SYSTEM CONTAINING A PRINTING DEVICE SUITABLE FOR USE OF THE METHOD

BACKGROUND OF THE INVENTION

The present invention relates to a method of printing a substrate with an inkjet printing device provided with at least one print head comprising at least one row of nozzles having a first end and a second end, such that an orientation of the row with respect to the substrate is defined by an imaginary line extending from the first end to the second end, comprising a first printing stage in which a strip of the substrate is provided with ink drops and a second printing stage in which the strip is provided with supplementary ink drops. The present invention also relates to an inkjet printing system containing a printing device suitable for use of the method.

A method of this kind is known from U.S. Pat. No. 5,640,183. A known problem in inkjet printing devices in which fixed locations ("pixels") on the substrate, which locations form a regular field of pixel rows and pixel columns, are provided with ink drops, is that deviations of individual nozzles may result in disturbing faults in a printed image. Thus a deviant or displaced nozzle may give rise to ink drops which leave the nozzle at the wrong angle ("skew jets"), so that the ink drops occupy a different place on the substrate with respect to the center (the normal position) of the fixed locations. A deviation can also give rise to ink drops with a deviant volume, a breakdown of a nozzle, and so on.

This method is used to mask such faults. The print heads used for the use of this method are provided with two rows of nozzles which together, as a result of interlaced positioning with respect to one another, form an imaginary nozzle row which has a resolution equal to the required print resolution.

Each row of nozzles of a print head is provided with a number of extra nozzles. In known methods, a substrate is printed in each case by providing a strip of a number of adjoining pixel rows with ink drops. In this way the strip is provided with a number of sub-images in a number of printing stages, typically two, the said sub-images together forming the image on the strip. According to this method, a series of successive nozzles is selected in the first printing stage from the set of the rows of nozzles (the imaginary nozzle row) of a print head, the number of nozzles in this series being equal to the total number of nozzles less the number of extra nozzles. If a print head is provided with two rows of 50 nozzles and 3 extra nozzles per row (so that the total number of nozzles is equal to 106), a series of 100 successive nozzles is selected with which a strip in a width of 100 adjoining pixel rows of the substrate is printed. After this first printing stage, a new series of 100 successive nozzles is selected from the available 106 nozzles of the print head. There are thus 7 different options for selecting a second series, i.e. the same series as used in the first printing stage and one of the other 6 possible series of 100 successive nozzles. A choice from these 7 options is made at random. After the choice has been made, the print head is displaced with respect to the substrate in a direction parallel to the nozzle rows over a distance corresponding to the selected second series of successive nozzles. The relevant strip is then provided with supplementary ink drops in the second printing stage. By printing each strip of pixel rows of the substrate with a plurality of sub-images in this way, each of said images being printed by a series of successive nozzles chosen at random, any printing faults due to deviations of the nozzles are distributed at random over the substrate so that they are less visible to the human eye.

A significant disadvantage of the known method is that as a result of the random choice there is an appreciable risk that a pixel row may be printed entirely with ink drops having the same fault, for example because they occupy a different position with respect to the normal position. Consequently, linear faults may occur in the image. The human eye is very sensitive to such linear faults and these faults are thus found to be disturbing in the printed image. A linear fault forms in any case if a pixel row is printed in both the first and second (and any following) printing stages with ink drops which originate from one specific deviant nozzle. It has also been found that within one print head there are many nozzles which have substantially the same deviations, i.e. they result in ink drops printed with the same fault. Since the majority of nozzles have a deviation there is a considerable risk of linear faults when the known method is used.

A second disadvantage of the known method is that the printing device productivity is reduced with respect to the maximum obtainable productivity since a number of nozzles in each row must be reserved as extra nozzles to make it possible for a random choice to be made for the second and any subsequent series of nozzles. There should be more nozzles provided in proportion as better masking of any printing faults due to deviations of the individual nozzles is required, and this further reduces productivity.

Another disadvantage of the known method is that prior to the second and any following printing stages the substrate must be displaced very accurately over a distance which, depending on the choice of the second series of successive nozzles, varies at random with the width of 0, 1 or a number of pixel rows (a maximum of 6 in the above-described example). A shift of this kind is obtained for example by moving the substrate with respect to the printhead by means of a motor. It is clear that these small shifts chosen at random mean that the paper transport must meet very stringent requirements in respect of accuracy.

SUMMARY OF THE INVENTION

The object of the present invention is to obviate these disadvantages. To this end, a method has been invented wherein the orientation of the row used in the first printing stage is substantially the opposite to the orientation of the row used in the second printing stage. This method is based on the realization that the deviations of the individual nozzles in a row are not random deviations but are subject to a considerable systematic order. Consequently, the risk of linear faults occurring when the known method is used is considerable. The systematic principle underlying the deviations of the nozzles may comprise a number of distinguishable forms of regularity.

Firstly, it has been found that a deviation of a nozzle is substantially independent of the intensity of the use of this nozzle. In other words, a nozzle will impart substantially the same fault to each drop ejected during the life of the print head. In addition, the deviations of the different nozzles within one row have been found to be not independent of one another in many types of print heads. With such a type of print head it has been found that the deviation of an individual nozzle is substantially equal to the deviations of the adjoining nozzles within the same row: for example if nozzle of a row of nozzles has a deviation resulting in an ink drop originating from the same nozzle deviating from the normal position on the substrate by a distance of 20 μm, then the ink drops originating from the nozzles i−1 and i+1 will also result in ink drops differing by about 20 μm from the normal position. It has also been found that the deviations of the individual nozzles within one row frequently have a slow progression, so that not only the directly adjoining nozzles within one row have substantially the same deviations, but also the nozzles further away. As a result of this regularity, a group of nozzles within one row, which are not situated far away from one another, has substantially the same deviations. As a result there is a considerable risk that a linear fault will form in the image if the displacement between the first and second printing stages takes place over just a few nozzles. The reason for this regularity is not entirely clear. One reason for the skew jets might be that such print heads are often formed by stretching a foil formed with the nozzles over a base. Since this foil can never be stretched completely flat, there will be convexities present. As a result, the nozzles situated on one side of such a convexity will give rise to ink drops which are ejected from the nozzle at the same deviant angle, which is defined primarily by the inclination of the foil with respect to the base. Another reason might be the semi-continuous production process of such foils, so that there is a considerable incidence of periodic deviations.

The result of such regularity in the deviations is that when the known method is used there is a great risk that a pixel row will be provided with ink drops all having the same fault, so that disturbing linear faults may occur in the image. By so shifting the row between the first and second printing stages wherein the orientation of said row in the second printing stage is substantially the opposite to the orientation in the first printing stage, the systematic principle underlying the deviations is interrupted so that the risk of linear faults in the image is minimized. In addition, this results in the advantage that no nozzles have to be reserved as extra nozzles, so that the productivity of the printing device in the method according to the present invention is not adversely affected. Finally, it is no longer necessary for the row to be very accurately shifted over a random-variation distance prior to the second printing stage. As a result, inter alia, the substrate transport does not have to satisfy such stringent requirements. In a preferred embodiment, the row used in the first printing stage is the same as the row used in the second printing stage. In this way, the inkjet printer need be provided with only one printhead. The opposite orientation of the row when this is used in order to provide the substrate strip with supplementary drops in the second printing stage can, for example, be achieved by rotating the printhead, of which the row is a part, through an angle of 180° in the plane parallel to and passing through the row. Another possibility is to rotate the substrate through an angle of 180° in the plane formed by the substrate itself.

In another preferred embodiment, the row used in the first printing stage differs from the row used in the second printing stage. This not only gives better masking of any printing faults due to the deviations of the nozzles, but in addition there is no longer any need to rotate the row used during the first printing stage, prior to the second printing stage. Since a different row is used in the second printing stage the opposite orientation of this other row can already be embodied in the fixed arrangement of the rows with respect to one another. For example, two separate but identical print heads with an opposite orientation can be disposed in the printing device, e.g. by rotating the head fixing means through an angle of 180° with respect to one another. After (a part of) the substrate has been provided with ink drops by means of the first print head in the first printing stage, (this part of) the substrate can be provided with supplementary ink drops in the second printing stage following thereon, using the second print head. The opposite orientation now arises not from actively rotating one of the two print heads but from the fixed arrangement of the heads in the printing device. It is also possible to keep the orientation of the print heads identical but to dispose the nozzle rows in opposite orientations on the print heads, e.g. by rotating the nozzle plates of the different print heads through 180° with respect to one another in the plane of the nozzle plates themselves during the actual production of the print heads. Another possibility would be to provide one print head with two rows of nozzles, the rows having opposed orientations with respect to one another.

The foregoing is also based on the recognition that the deviations of the nozzles may be subject to a third form of regularity. It has been found that the deviation pattern of a row of nozzles is substantially the same as the deviation pattern of each following row of nozzles produced in the same way (for example in the same jig). The result, using a number of nozzle rows distributed, for example, over as many print heads, to form an image on a substrate, is that even linear faults may occur if ink drops are printed in one pixel row originating from different print heads: namely if the ink drops in one pixel row originate from corresponding nozzles of the different nozzle rows. By also using the method according to the present invention for an inkjet printing device in which a set of print heads of this kind is used for printing a substrate, i.e. by coordinating in accordance with the invention the mutual orientation of the print heads used for printing a pixel row of the substrate in the different printing stages, linear faults are prevented from forming in the image.

For the use of the method according to the present invention it is not essential that the second printing stage in which a number of pixel rows is provided with supplementary ink drops should follow directly on the first printing stage. It is possible for firstly a number of strips of the substrate to be provided with a first series of ink drops, whereafter the pixel rows in each of these strips is provided with supplementary second series of ink drops in a following printing stage. It is important that the orientation of the nozzle row in the following printing state for providing a specific strip of pixel rows with supplementary ink drops should be the opposite to the orientation of the nozzle row in the first printing stage. Thus it is also possible to perform the first and second printing stages simultaneously. This is possible, for example, if use is made of two print heads which are fixed in the inkjet printer scanning carriage with opposite orientations to one another. In principle, both sub-images can then be printed in one pass of the scanning carriage.

In addition, it is immaterial to the use of the method according to the present invention whether the print strategy used is one in which the sub-images printed in the different printing stages form the total image by printing ink drops next to one another, e.g. in a "chessboard" pattern, or on top of one another ("dot-on-dot").

The present invention also relates to an inkjet printing device adapted to the use of the method according to the invention. In a preferred embodiment, the inkjet printing device comprises at least two printheads. In a further preferred embodiment, the printhead of the printing device comprises at least two rows of nozzles. This gives better masking of the printing faults due to deviations of individual nozzles. This is associated with the fact that the nozzle rows within one printhead have very different deviation patterns.

The reason for this is not clear but may possibly be related to the fact that the different nozzle rows within one printhead have a relatively considerable distance, typically some millimeters, from one another, and also that different nozzle rows of one printhead are often produced with separate means. By combining a number of (independent) nozzle rows in one printhead a small part of the systematic principle of the deviations is as it were pre-interrupted.

BRIEF DESCRIPTION OF THE DRAWINGS

The present invention will now be explained in detail with reference to the accompanying drawings, wherein.

DETAILED DESCRIPTION OF THE INVENTION

Figure 1:
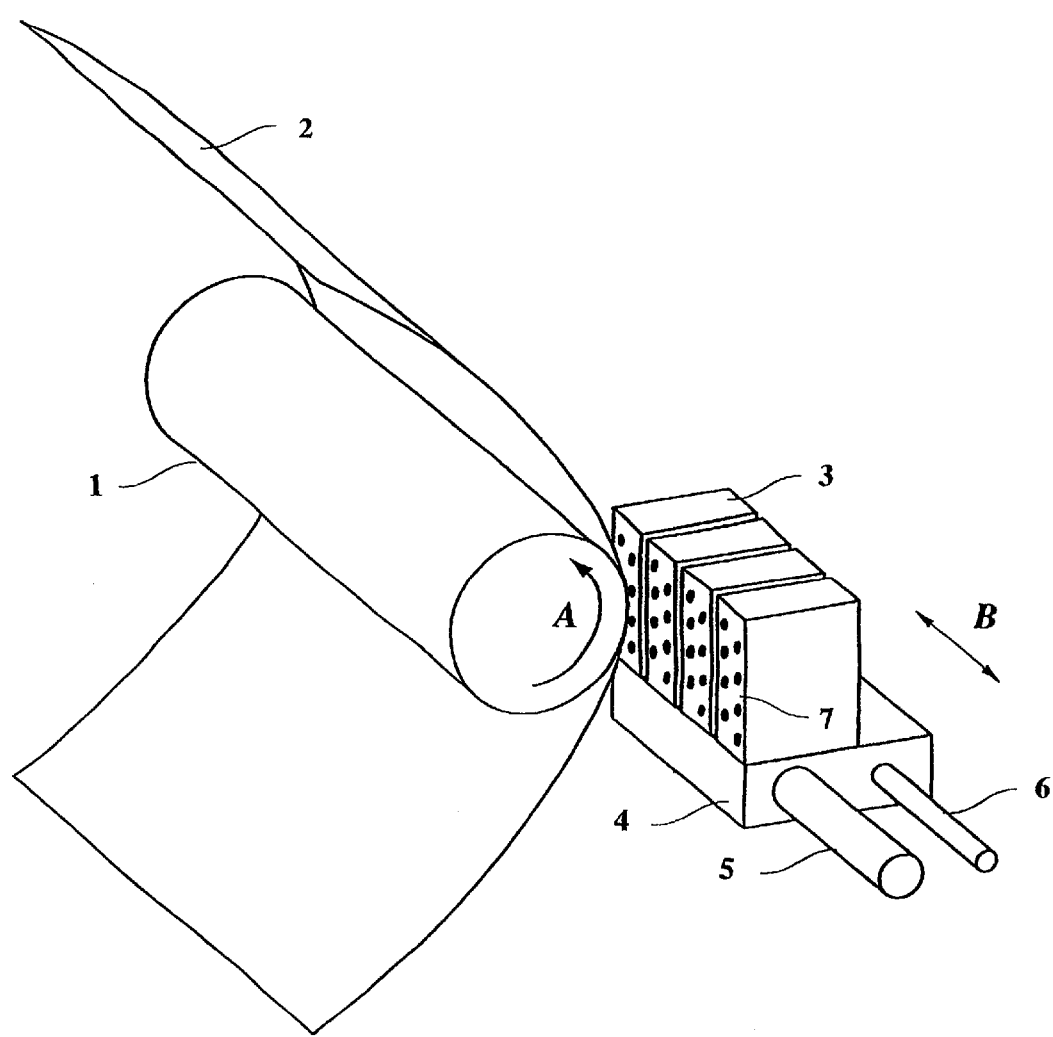
FIG. 1 is a printing device provided with a number of print heads.

FIG. 1 shows a printing device provided with a number of print heads. In this embodiment, the printing device comprises a roller 1 for supporting a substrate 2 and moving it along the four print heads 3. The roller 1 is rotatable about its axis as indicated by arrow A. A scanning carriage 4 carries the four print heads 3 and can be moved in reciprocation in the direction indicated by the double arrow B, parallel to roller 1. In this way the print heads 3 can scan the receiving substrate 2, e.g. a sheet of paper. The carriage 4 is guided on rods 5 and 6 and is driven by suitable means (not shown).

In the embodiment as illustrated in the drawing, each print head comprises eight ink ducts, each with its own nozzle 7, which form two rows of four nozzles each perpendicular to the axis of roller 1. In a practical embodiment of a printing device, the number of ink ducts per print head will be many times greater. Each ink duct is provided with means for activating the ink duct (not shown), e.g., a thermal or an electromechanical element and an associated electrical drive circuit (not shown). In this way, the ink duct, the said means for actuating the ink duct, and the drive circuit form a unit which can be used for ejecting ink drops in the direction of roller 1.

When a substrate is printed with a printing device of this kind, in which ink drops are jetted from the nozzles, the substrate or part of said substrate is (imaginarily) divided up into fixed locations, which form a regular field of pixel rows and pixel columns. In one embodiment, the pixel rows are perpendicular to the pixel columns. The resulting separate locations can each be provided with one or more ink drops. The number of locations per unit of length in the directions parallel to the pixel rows and pixel columns is termed the resolution of the printed image, indicated, for example, as 400×600 d.p.i. ("dots per inch"). By activating the rows of nozzles image-wise when they move over a strip of the substrate, there forms on the substrate an image built up from ink drops.

Figure 2A:
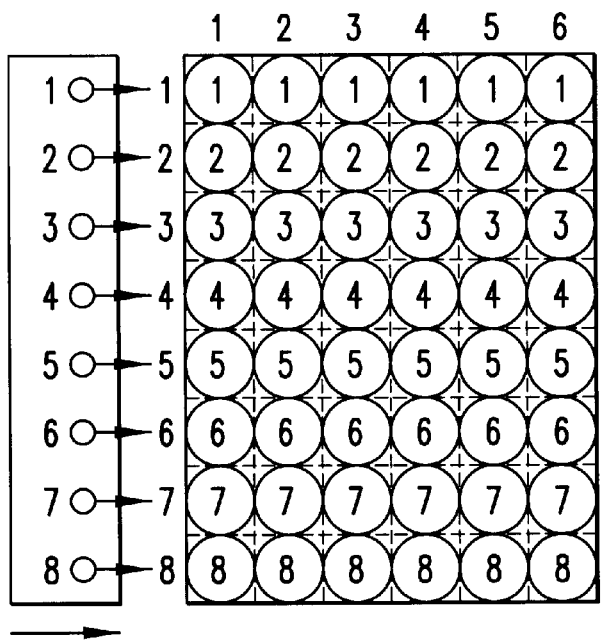
FIGS. 2A–B show the possible visible effect of the deviation of a nozzle.
Figure 2B:
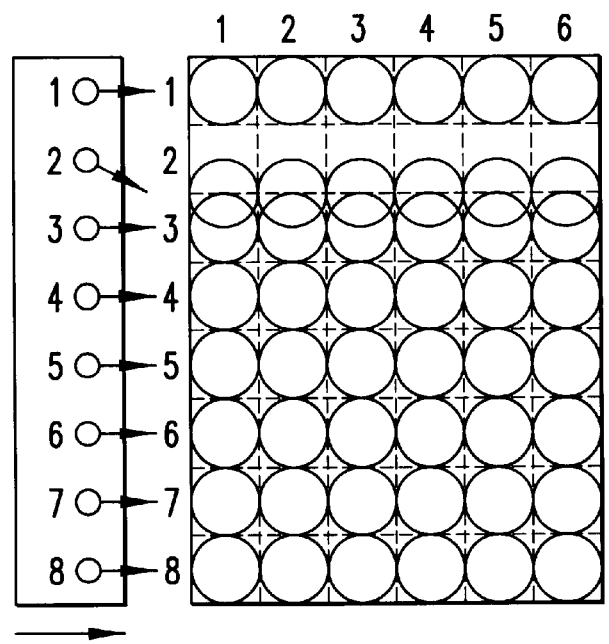

FIGS. 2a and 2b show what the visible effect of a nozzle deviation may be if no corrective steps are taken. This example makes use of a print head provided with a row of eight nozzles. FIG. 2a indicates how part of a substrate can be printed with this print head in a size of 8(pixel rows)×6 (pixel columns) locations. If a single-pass printing strategy is used, a print head then moves only once over the part of the substrate for printing and the entire image is formed in that printing stage. In this example, the image consists of a solid surface. Let it be assumed that all the nozzles correctly eject ink drops (this is indicated in FIG. 2a by the horizontal directional arrows originating from each nozzle). If the print head moves over the substrate in a direction parallel to the pixel rows and the nozzles 1–8 are activated image-wise, the resulting image is as shown in FIG. 2a. The originating nozzles for the printed ink drops is indicated. Let us assume that nozzle 2 has a slight deviation so that ink drops are ejected at an angle deviating from the normal axis, as indicated by the directional arrow at this nozzle in FIG. 2b, and that the other nozzles have no deviations. When the relevant part of the substrate is printed with the same printing strategy, the image formed is as shown in FIG. 2b. It can be seen that a linear fault forms in the image due to the propagation of the fault as a result of the deviation of nozzle 2 (so that the ink drops are not printed in the center of the locations of pixel row 2). Faults of this kind are readily visible to the human eye and are therefore very disturbing in a printed image.

Figure 3A:
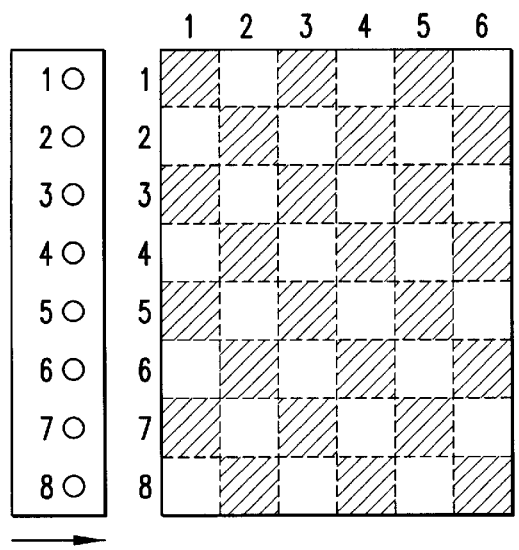
FIGS. 3A–C are an example of the method for printing a substrate according to the present invention.

FIG. 3 gives an example of the method of printing a substrate according to the present invention. The printing strategy will be explained by reference to a print head as described in the example of FIGS. 2a and 2b. Just as in the known method, a substrate is printed in a number of stages, i.e. a "multi-pass" strategy, part of the image formed by using a dilution pattern being printed in each stage. The diluted images printed in each stage complement one another so that on completion of all these stages the total image is formed. In the example described here, we shall, for the sake of simplicity, assume a two-stage strategy, in which the sub-images are printed in accordance with what is known as a chessboard pattern, so that two complementary sub-images are printed in two printing stages. FIG. 3a shows what part of the substrate can be printed when the print head moves in the direction indicated over the substrate in the first stage, the nozzles 1–8 corresponding to the pixel rows 1–8. The locations in the first pixel row can be successively provided with an ink drop originating from nozzle 1, the locations in the second pixel row can be successively provided with ink drops originating from nozzle 2, and so on. When the print head has completely passed the substrate, the orientation of the print head is changed with respect to the substrate so that the orientation of the nozzle row with respect to the substrate is the opposite to the orientation of said row in the first printing stage. As a result, nozzles 8–1 correspond to the pixel rows 1–8. The print head is then moved over the substrate in the opposite direction, the complementary sub-image being printed.

Figure 3B:
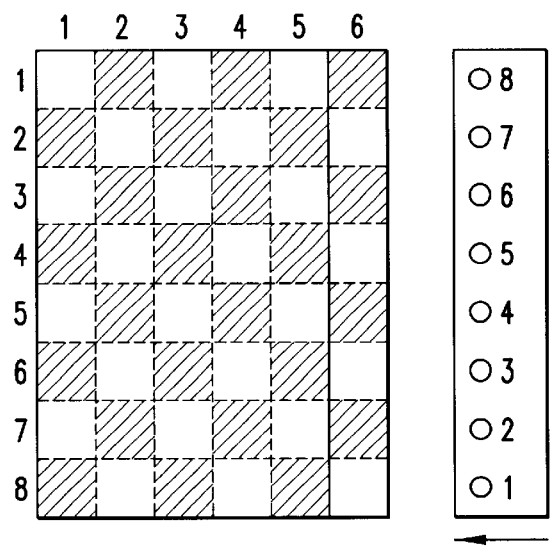
Figure 3C:
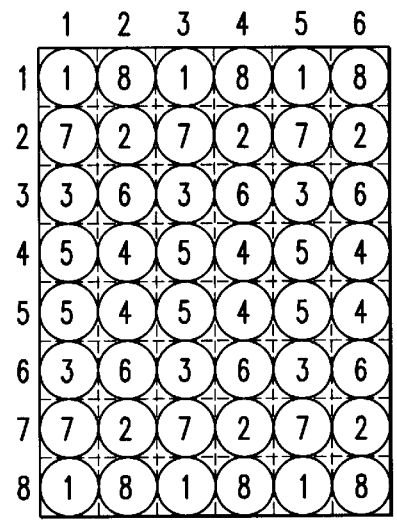

If the image in the relevant part of the substrate consists of a solid surface, then the ink drop distribution obtained is as indicated in FIG. 3c. It will be seen here that ink drops originating from one individual nozzle are no longer situated next to one another in one pixel row.

Figure 4A:
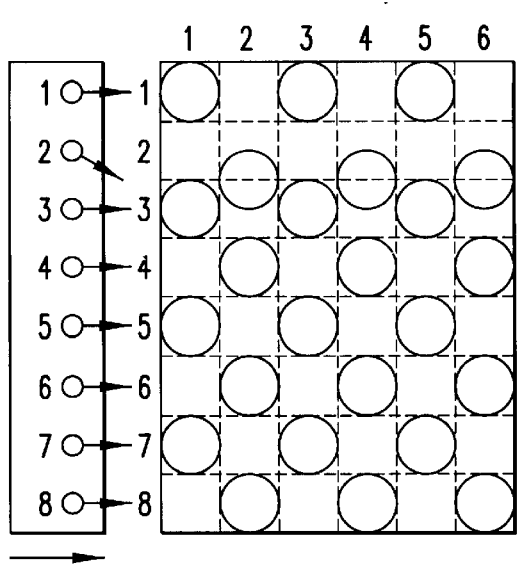
FIGS. 4A–C show the way in which visible effects of nozzle deviations are masked using the method according to the present invention.
Figure 4B:
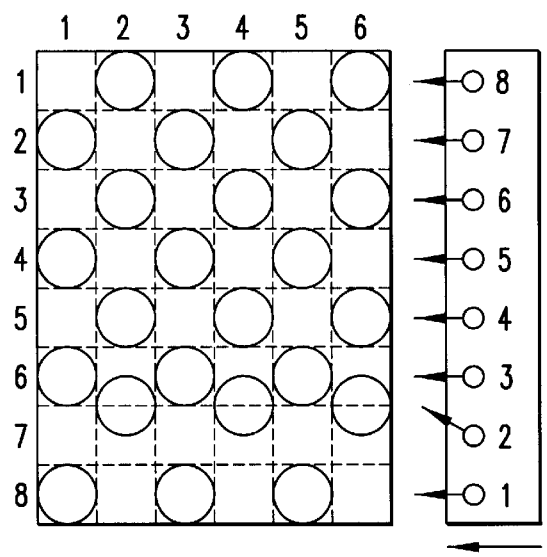
Figure 4C:
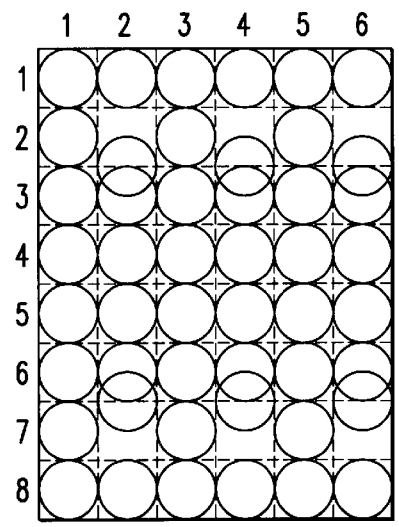

FIGS. 4a, 4b and 4c show the way in which visible effects of nozzle deviations re masked using the method according to the present invention. The method as described in FIGS. 3a and 3b is applied in this example to the print head as described in connection with FIG. 2b, which print head has a deviant nozzle 2.

In this example the image consists of a solid surface. FIG. 4a shows the sub-image forming in the first stage using the chessboard pattern as shown in FIG. 3a. FIG. 4b shows the sub-image forming in the second stage, the orientation of the nozzle row being opposite. In FIG. 4c the two sub-images are combined. It will be seen that the linear fault which consisted of a white streak in the solid surface is replaced by two less densely printed lines, and this is much less disturbing in the image.

Figure 5A:
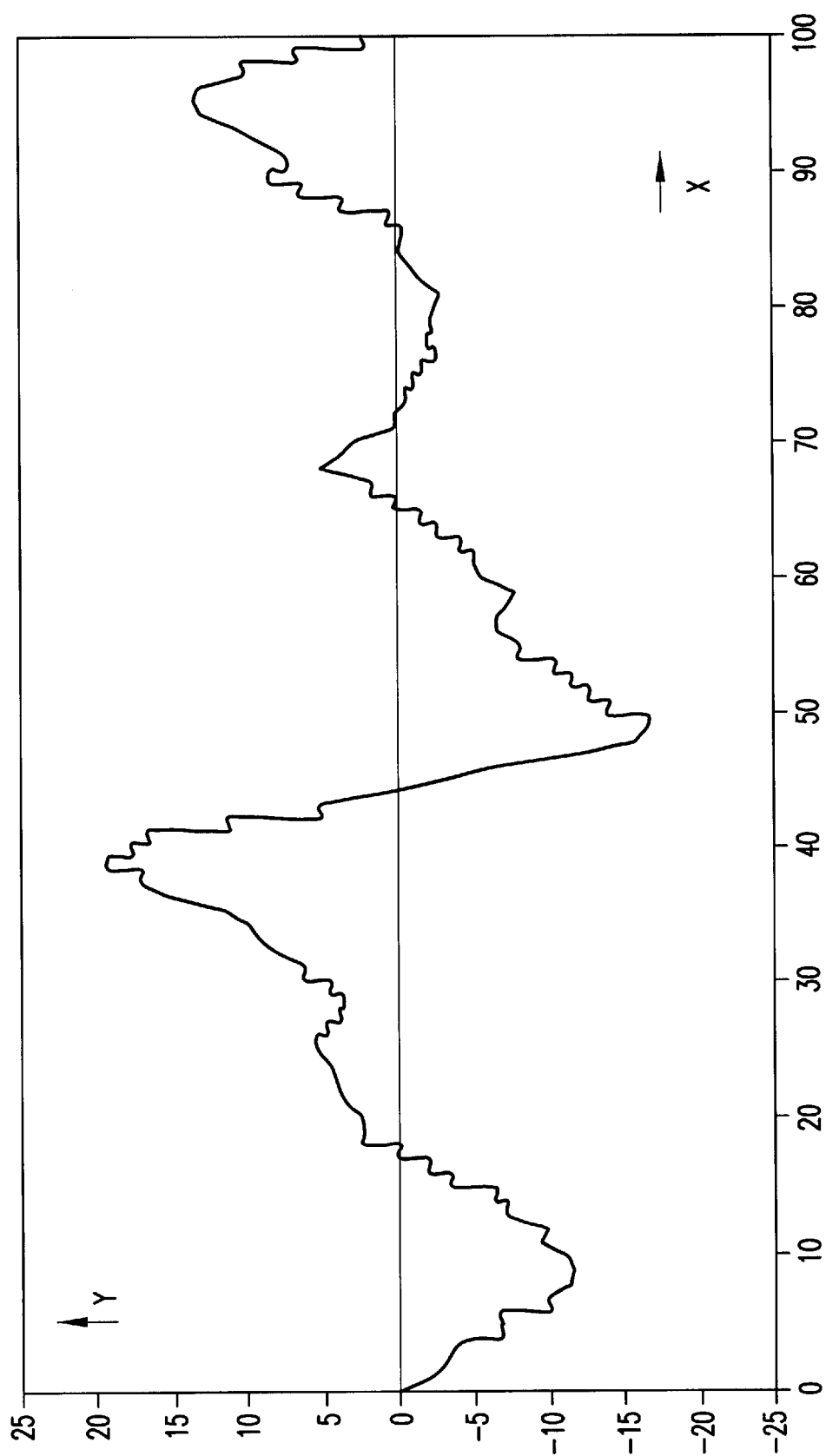
FIG. 5A–B are deviation patterns of the nozzles associated with one row of a specific print head.
Figure 5B:
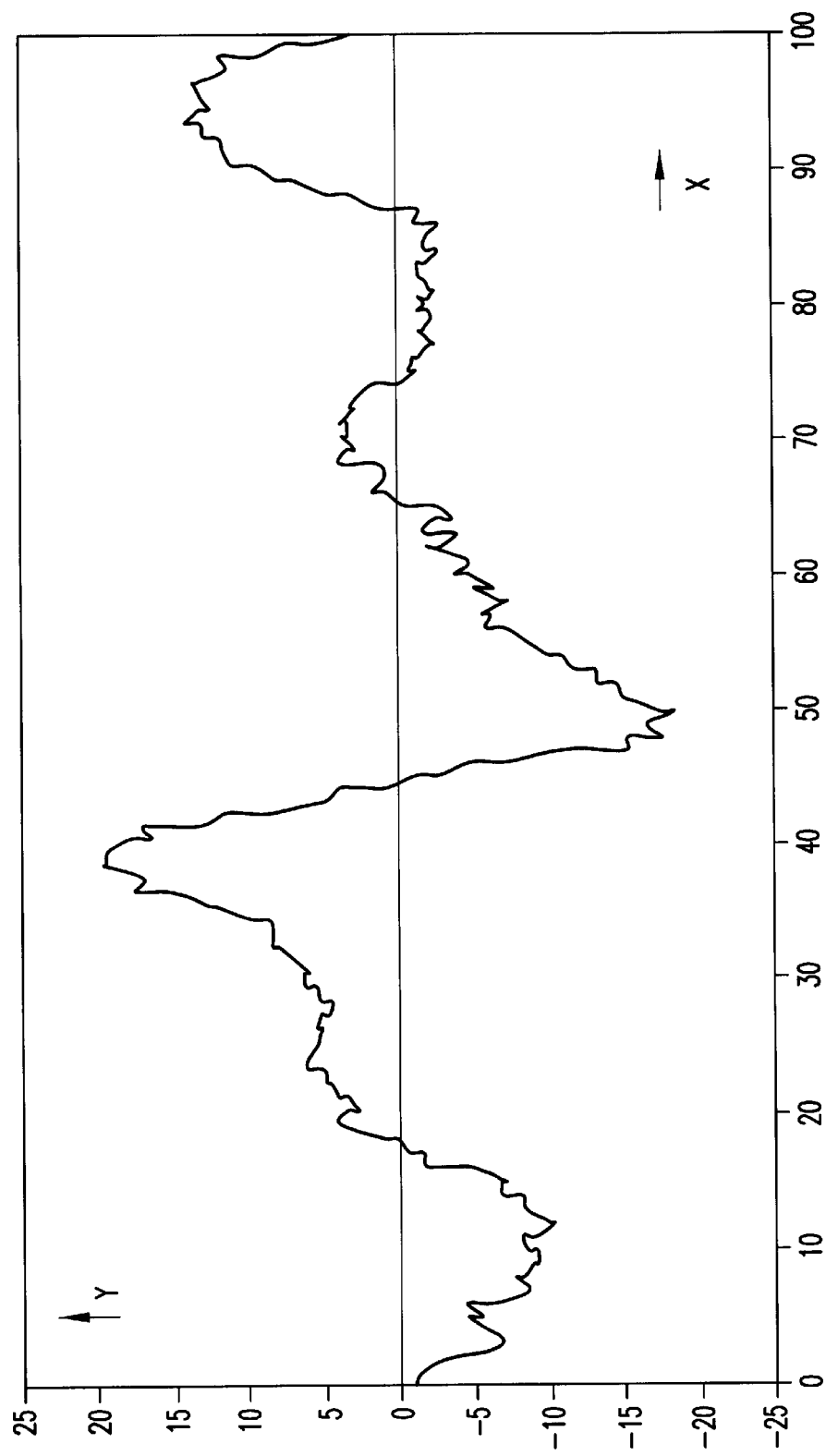

FIGS. 5a and 5b show a deviation pattern of the nozzles belonging to one row of a specific printhead. In this case the deviation pattern relates to the "skew jets". In this example the printhead is built up of two rows of one hundred nozzles each having a resolution of 75 n.p.i. This means that a strip of a width of 100/75=1.33 inches can be printed with a resolution of 150 d.p.i. with a printhead of this kind in one printing stage. FIG. 5a shows against the nozzle number (plotted on the x-axis), for the first nozzle row of the relevant printhead, the distance in micrometers by which an ink drop deviates from the normal position, i.e. the position which an ink drop would occupy on the substrate if it were printed exactly in the center of a location. A positive value is equivalent to a net deviation which is the result of the ejection of an ink drop at a positive angle, while a negative value is the result of the ejection of an ink drop at a negative angle. The relationship shown in this drawing clarifies the fact that the deviations exhibited by the nozzles forming part of one row are not independent of one another but that they form a slowly progressing function, in this case a function having a number of peaks and troughs over the length of the row. The cause of this sinusoidal relationship is not completely clear but is probably due to the method of producing the printheads. It is quite likely that a different production method would result in a different deviation pattern. Thus a possible pattern is one in which the deviation becomes monotonously larger or smaller as a function of the nozzle number. Also, a pattern in which each nozzle has a deviation independent of its neighboring (adjoining) nozzles—what is known as a random deviation for each nozzle—is possible, for example if each nozzle of a row is made with an individual instrument or in an independent machining step. This regularity of itself is sufficient to enable the method according to the present invention to be successfully applied. In this case, too, the deviation of an individual nozzle must be prevented from propagating in the direction of a pixel row.

FIG. 5b shows the same relationship for the associated print head again after the print head has been used for printing substrates for a period of 20 hours spread over a period of 2 weeks. It will be seen that the deviations of the individual nozzles are still substantially the same after these two weeks.

If the deviation pattern of the corresponding (first) nozzle row of any other print head produced in the same way is determined in the manner indicated above, then it will be seen that it has substantially the same deviation pattern.

Figure 6:
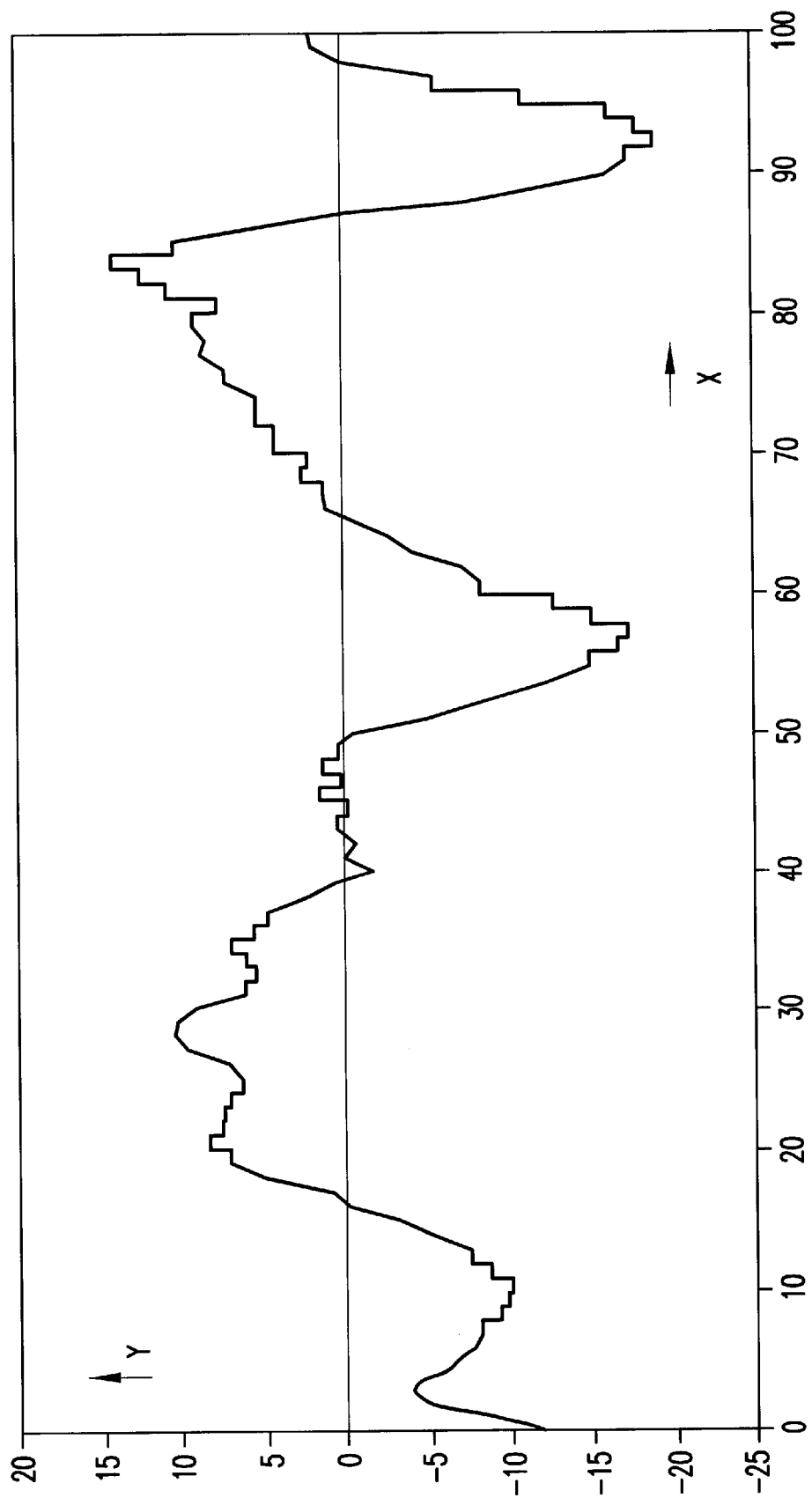
FIG. 6 shows the corresponding deviation pattern of another nozzle row of the print head as described in the example relating to FIG. 5.

FIG. 6 shows the corresponding deviation pattern of the second nozzle row of the print head as described in the example belonging to FIG. 5. It is apparent from FIG. 6 that the deviation pattern of this second row differs considerably from the deviation pattern of the first row. There is no question of any relationship between the deviation patterns of the first and second nozzle rows. If in this case too the deviation pattern of the second nozzle row of a different print head produced in corresponding manner were measured, it would be apparent that it has substantially the same deviation pattern.

Figure 7:
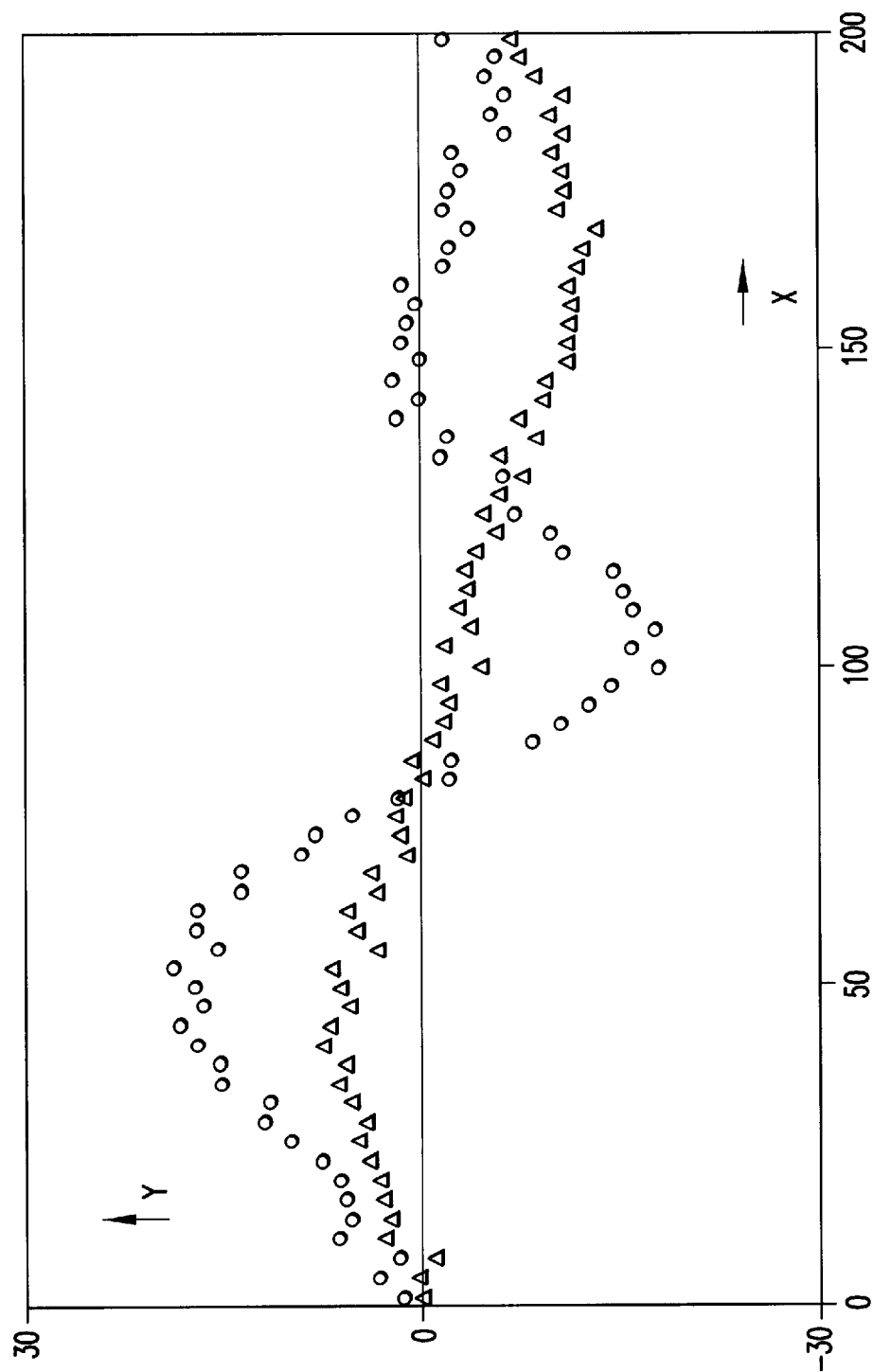
FIG. 7 is an example of the result of using the method according to the present invention for a specific print head.

FIG. 7 gives an example of the result of using the method according to the present invention for a specific print head. In this example the print head comprises one row of 200 nozzles, plotted on the x-axis of the drawing. The nozzles will be seen to have a deviation pattern such that the volume of the jetted ink drops progresses from the first end to the second end of the row. If a solid surface were printed according to the method as shown in FIG. 2a with a print head of this kind, pixel lines would form (1-pixel rows) with widths deviating from the average width. If a nozzle gives rise to ink drops having a volume greater than average, then the perceived width of the associated pixel line will, on average, be larger than average, and this is indicated in FIG. 7 by a positive value on the y-axis in arbitrary units. A negative value is the result of a nozzle which jets ink drops with a volume smaller than average.

The curve marked with the open circles indicates the curve of the width of two hundred adjoining pixel lines using the method as indicated in FIG. 2a. The curve indicated by the open triangles shows the same curve of the pixel lines using the method according to the invention, particularly the embodiment shown in FIGS. 3a and 3b. It will be seen that by changing the orientation of the row between the first and second printing stages there is a considerable improvement in the uniformity of the printed image.

Figure 8:
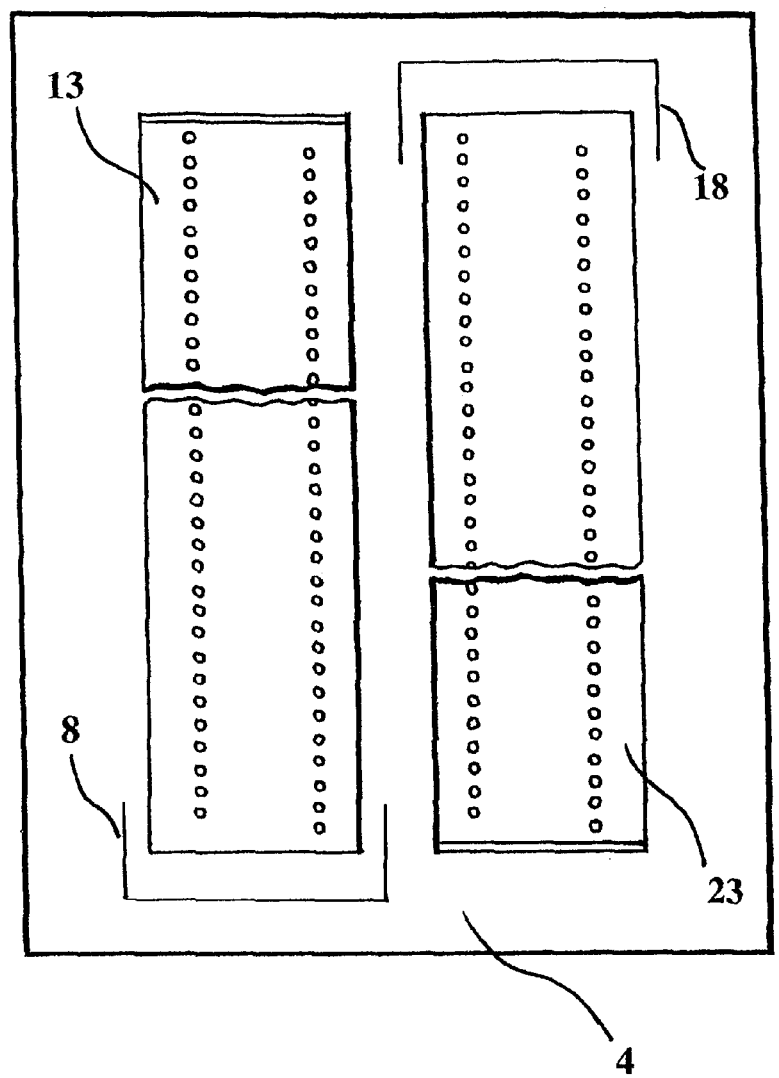
FIG. 8 is an example of an inkjet printing device adapted to use of the method according to the present invention.

FIG. 8 is an example of the arrangement of a pair of print heads in the scanning carriage 4 of an inkjet printing device adapted for use of the method according to the present invention.

In this example, the printing device comprises two print heads 13 and 23, each provided with two hundred nozzles distributed over two rows of one hundred nozzles which occupy an interlaced position with respect to one another (for simplicity's sake the total number of nozzles is not shown). The print heads are used to print the black image in a full-color illustration. The print heads are rotated through an angle of 180° with respect to one another so that the nozzle rows occupy opposite orientations with respect to one another. The fixing means 8 and 18 of the scanning carriage 4 have been given a suitable position for this purpose. In principle, it is irrelevant to the present invention whether the two print heads are disposed in line, i.e. the nozzles are situated exactly in extension of one another in the direction perpendicular to the nozzle rows, or whether they are also in an interlaced position, or whether they are or are not additionally displaced over a number of nozzles with respect to one another.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of printing a substrate with an inkjet printing device provided with at least one printhead comprising at least one row of nozzles having a first end and a second end, such that an orientation of the row with respect to the substrate is defined by an imaginary line extending from the first end to the second end, which comprises printing the substrate in a first printing stage in which a strip of the substrate is provided with ink drops and printing the substrate in a second printing stage in which the strip is provided with supplementary ink drops, wherein the orientation of the row used in the first printing stage is substantially opposite to the orientation of the row used in the second printing stage.

2. The method according to claim 1, wherein the row used in the first printing stage is the same as the row used in the second printing stage.

3. The method according to claim 1, wherein the row used in the first printing stage is different from the row used in the second printing stage.

4. The method of claim 1, wherein two printheads are fixed in the inkjet printer with opposite orientations relative to one another, wherein two sub-images can be printed in one pass of a scanning carriage.

5. An inkjet printing system for printing a substrate, which system comprises an inkjet printing device provided with at least one printhead having at least one row of nozzles having a first end and a second end, the orientation of the row with respect to the substrate being defined by an imaginary line extending from the first end to the second end, means for carrying out a first printing stage in which a strip of the substrate is provided with ink drops from said nozzles, and means for carrying out a second printing stage in which the strip is provided with supplementary ink drops from said nozzles, wherein means are provided in which the orientation of the row used in the first printing stage is established to be substantially opposite to the orientation of the row used in the second printing stage.

6. The inkjet printing system according to claim 5, wherein the printing device comprises at least two printheads.

7. The inkjet printing system according to claim 6, wherein the print head of the printing device comprises at least two rows of nozzles.

* * * * *